(12) United States Patent
Sergyeyenko et al.

(10) Patent No.: US 7,076,880 B2
(45) Date of Patent: Jul. 18, 2006

(54) TWO WIRE CIRCUIT FOR A LASER PENDULUM

(75) Inventors: Oleksiy P Sergyeyenko, Brockville (CA); David M Shaver, Brockville (CA); James D Marshall, Mallorytown (CA)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 11/055,383

(22) Filed: Feb. 10, 2005

(65) Prior Publication Data

US 2005/0178016 A1 Aug. 18, 2005

Related U.S. Application Data

(60) Provisional application No. 60/544,976, filed on Feb. 13, 2004.

(51) Int. Cl.
*G01C 15/00* (2006.01)

(52) U.S. Cl. .................. 33/286; 33/291; 33/DIG. 21

(58) Field of Classification Search .............. 33/283, 33/286, 290, 291, 292, DIG. 21; 356/250
See application file for complete search history.

(56) References Cited

U.S. PATENT DOCUMENTS

| | | | | |
|---|---|---|---|---|
| 4,183,667 A | * | 1/1980 | Denton | 356/250 |
| 4,448,528 A | * | 5/1984 | McManus | 356/250 |
| 4,993,161 A | * | 2/1991 | Borkovitz | 33/291 |
| 5,552,886 A | * | 9/1996 | Kitajima et al. | 356/250 |
| 6,195,901 B1 | * | 3/2001 | Falb | 33/286 |
| 6,493,952 B1 | * | 12/2002 | Kousek et al. | 33/286 |
| 6,604,291 B1 | * | 8/2003 | Waibel et al. | 33/283 |

FOREIGN PATENT DOCUMENTS

EP 1564525 A2 * 8/2005

* cited by examiner

*Primary Examiner*—R. Alexander Smith
(74) *Attorney, Agent, or Firm*—Harness, Dickey & Pierce, P.L.C.

(57) ABSTRACT

A two wire laser control circuit for a laser leveler includes a switch mounted on a housing and having an electrical current passing therethrough. The switch has a first position and a second position. A diode bridge is mounted on a pendulum. A plurality of laser diodes are mounted on the pendulum and are electrically coupled to the diode bridge. A first wire extends from the switch to the diode bridge. A second wire extends from the switch to the diode bridge. Current from the switch passes through the first wire to the diode bridge and to one of the plurality of laser diodes when the switch is in the first position. Current from the switch passes through the second wire through the diode bridge and to all of the plurality of laser diodes when the switch is in the second position.

12 Claims, 6 Drawing Sheets

TWO WIRE CIRCUIT FOR A LASER PENDULUM

CROSS-REFERENCE TO RELATED APPLICATIONS

This application claims the benefit of U.S. Provisional Application No. 60/544,976, filed on Feb. 13, 2004, the disclosure of which is incorporated herein by reference.

FIELD OF THE INVENTION

The present invention relates to a circuit for a laser pendulum, and more particularly to a two wire circuit for a laser pendulum.

BACKGROUND OF THE INVENTION

The novel laser pendulum, as disclosed in commonly assigned U.S. patent application Ser. No. 10/979,953 and herein incorporated by reference in its entirety, provides a laser pendulum having a plurality of laser diodes for emitting a laser line for leveling. These lasers may be operated in a "straight line" mode wherein only one laser is activated to produce a straight line projected on an object, or in a "360°" mode wherein all of the lasers are activated and projected as a horizontal line in a 360° arc.

As noted above, the laser diodes are mounted on a pendulum which is free to swing under the force of gravity. This allows the laser diodes to naturally produce a horizontal line as the pendulum centers itself under gravity. However, power must be supplied to the laser diodes in order to activate the leveling lasers. In the past, a pair of thin coiled wires would connect the laser diodes from the pendulum to a power source that is not located on the pendulum. These coiled wires, however, can affect the leveling accuracy due to the wire stiffness, thereby prohibiting the pendulum from swinging freely under the force of gravity. When non-simultaneous operation of the laser diodes is required, a typical solution is to employ a third wire. This third wire further limits the ability of the pendulum to swing free, thereby further reducing the pendulum accuracy.

Currently, it is an object of the present invention to provide the art with a two wire circuit for controlling the plurality of laser diodes independently of one another without reducing the accuracy of the laser pendulum.

SUMMARY OF THE INVENTION

A two wire laser control circuit for a laser leveler includes a switch mounted on a housing and having an electrical current passing therethrough. The switch has a first position and a second position. A diode bridge is mounted on a pendulum. A plurality of laser diodes are mounted on the pendulum and are electrically coupled to the diode bridge. A first wire extends from the switch to the diode bridge. A second wire extends from the switch to the diode bridge. Current from the switch passes through the first wire to the diode bridge and to one of the plurality of laser diodes when the switch is in the first position. Current from the switch passes through the second wire through the diode bridge and to all of the plurality of laser diodes when the switch is in the second position.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
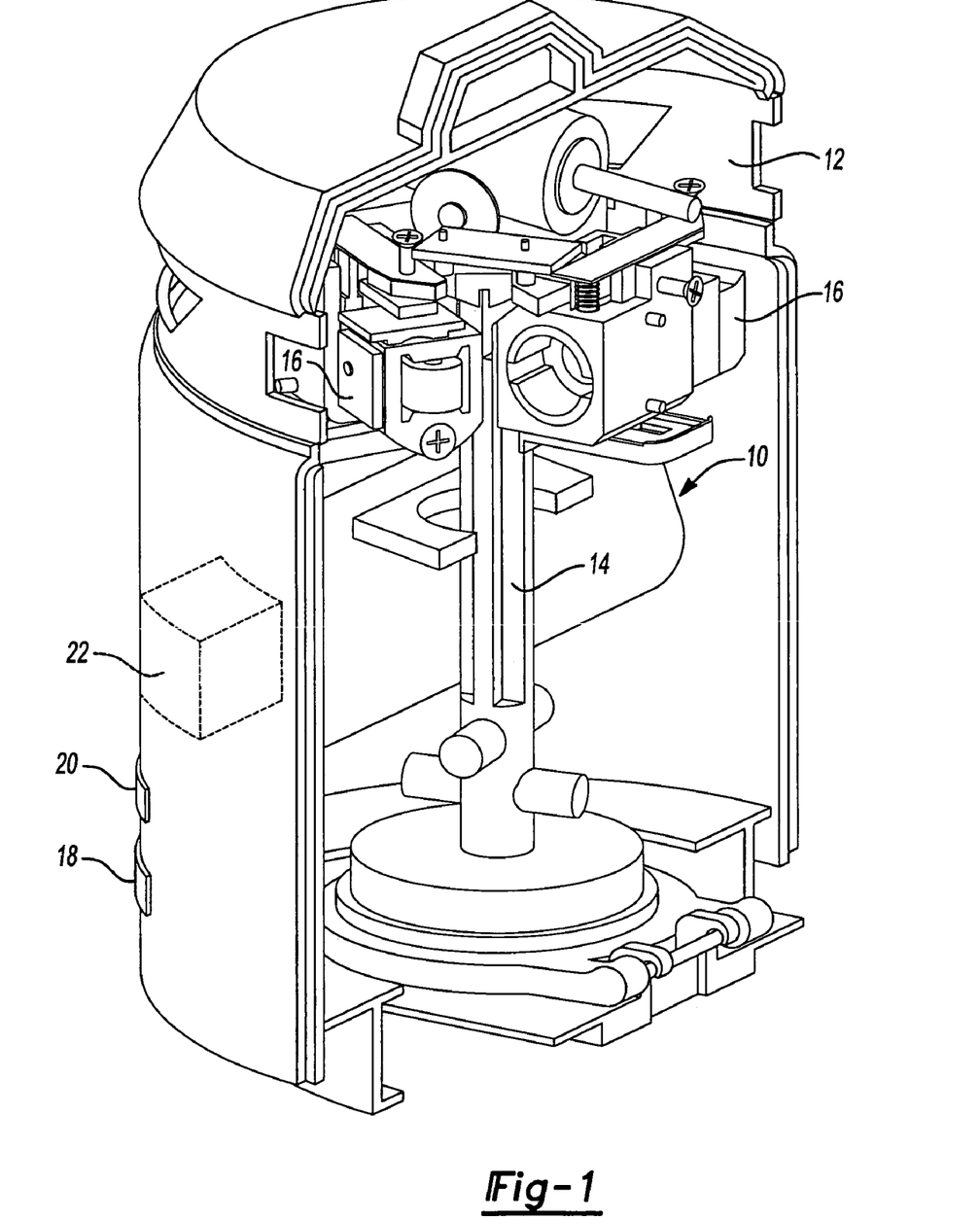
FIG. 1 is an exemplary laser leveling device incorporating the two wire laser control circuit constructed according to the principles of the present invention.

With reference to FIG. 1, an exemplary laser pendulum is shown and generally indicated by reference numeral 10. The laser pendulum 10 includes a two wire laser control circuit constructed according to the principles of the present invention and generally indicated by reference numeral 100 in FIGS. 2 and 3. The laser pendulum 10 generally includes a housing 12 that supports a pendulum 14. A plurality of laser diodes 16 are mounted at a top portion of the pendulum 14. As the pendulum 14 swings free, the plurality of lasers 16 are brought to a horizontal plane. A power switch 18 and a mode selection switch 20 are located on the housing 12 separate from the pendulum 14. The switches 18, 20 can be of the push-button or other known type of switch. A power source 22, for example a plurality of batteries, is located within the housing 12. The power source 22 is electrically coupled to the plurality of lasers 16 through the power switch 18 and through the mode selection switch 20.

Figure 2A:
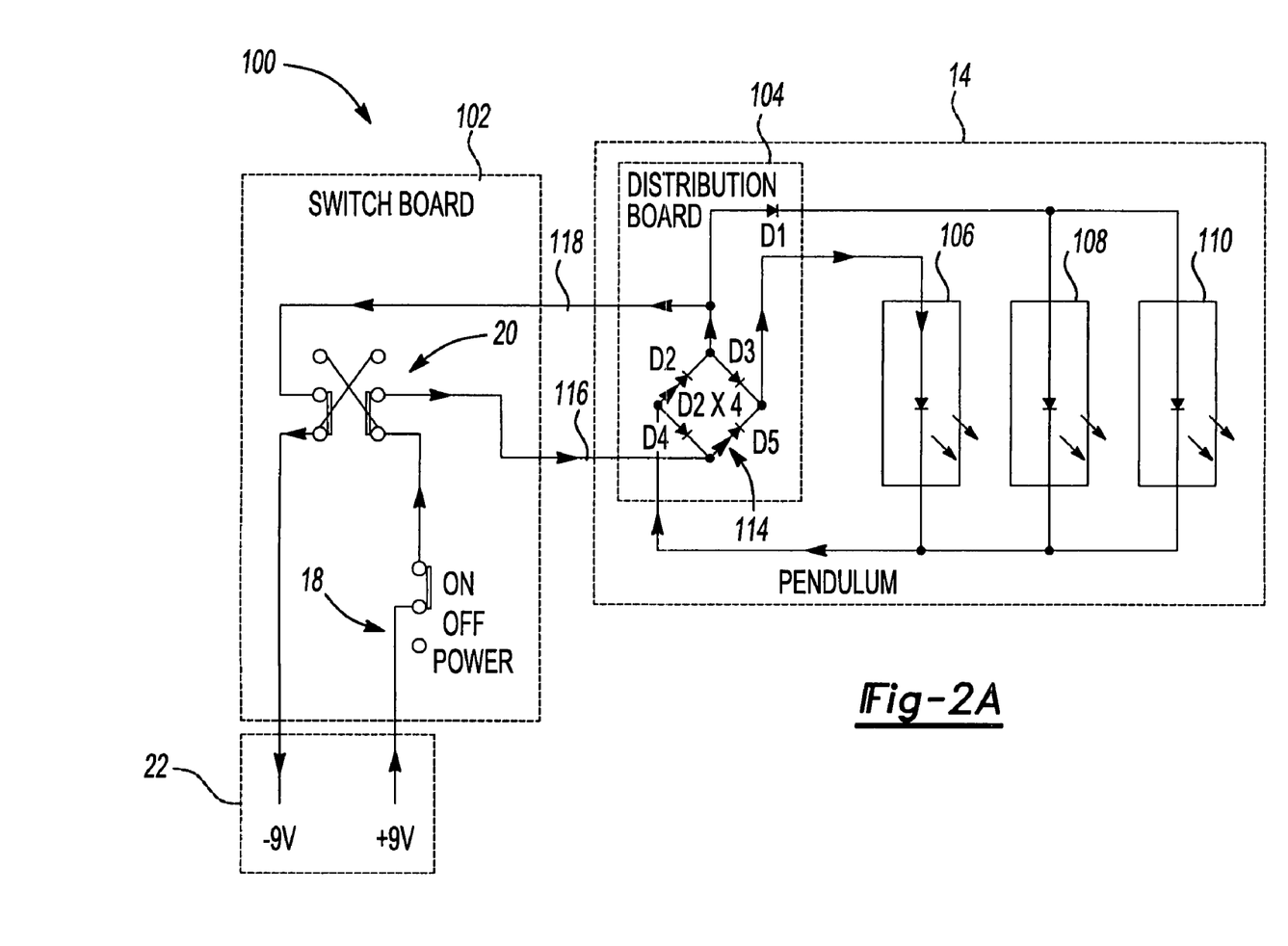
FIG. 2A is a schematic diagram of the two wire laser control circuit constructed according to the principles of the present invention in a straight line mode.

Turning to FIG. 2A, the two wire laser control circuit 100 will now be described in detail. The two wire laser control circuit 100 generally includes the power source 22, a switch board 102, a distribution board 104, and a plurality of laser diodes including a first laser diode 106, a second laser diode 108, and a third laser diode 110.

The power source 22 is electrically coupled to the switch board 102. The power source 22 is preferably a conventional DC or AC power source that provides a certain voltage. In the particular example provided, the power source 22 provides a 9 voltage alternating current to the switch board 102.

The switch board 102 is electrically coupled to the power source 22 and the distribution board 104. The switchboard 102 is mounted to the housing 12 (FIG. 1) and includes the power switch 18 and the mode selection switch 20. The power switch is electrically coupled to the power source 22 and the mode selection switch 20. The power switch 18 is preferably a one pole two position switch. Accordingly, the power switch 18 provides two positions including a "power on" and a "power off" position. When the power switch 18 is in the "power on" position, current flows from the power source 22 through the power switch 18 and flows to the mode selection switch 20. When the power switch 18 is in the "power off" position, current is interrupted from flowing through the power switch 18.

The mode selection switch 20 is a two pole two position switch providing a "straight line" position and a "360 degree" position. As will be described in greater detail below, the "straight line" position provides current to only the first laser diode 106 while the "360 degree" position provides current to all of the laser diodes 106, 108, 110. While in the particular example provided, the power switch 18 and the mode selection switch 20 are provided as separate, it should be appreciated that they may be combined having a two pole three position switch.

With continued reference to FIG. 2A, the distribution board 104 is electrically coupled to the mode selection switch 20 on the switchboard 102. The distribution board 104, however, is located on the pendulum 14. The distribution board 104 includes a first diode D1 and a diode bridge 114. The diode bridge 114 includes four diodes, labeled D2, D3, D4, and D5. Diodes D2 and D3 are connected in series, diodes D4 and D5 are connected in series, and diodes D2, D3 are connected in parallel with diodes D4, D5.

The diodes D1–5 cooperate with the mode selection switch 20 to selectively supply power to either the first laser diode 106 or to all three laser diodes 106, 108, and 110. In the example provided, diode D1 is electrically coupled to a position between diodes D2 and D3 and electrically coupled to the second and third laser diodes 108, 110. The diode bridge 114 is in turn electrically coupled to the first laser diode 106 from a position between diodes D3 and D5. Each laser diode 106, 108, 110 is also electrically coupled to the diode bridge 114 at a position between diodes D2 and D4.

Two electrical couplings, preferably conductive insulated wires, span the distance between the switchboard 102 located on the housing 12 and the distribution board 104 located on the pendulum 14. The first wire, indicated by reference numeral 116, couples the mode selection switch 20 to the diode bridge 114 at a position between diodes D4 and D5. The second wire, indicated by reference numeral 118, couples the mode selection switch 20 to a position between the diode bridge 114 and the first diode D1.

When the mode selection switch 20 is in the "straight line" position and the power switch 18 is in the "power on" position, only the first laser diode 106 is energized. The current path is indicated by the arrows in FIG. 2A. Specifically, current flows through the power switch 18 from the power source 22 to the mode selection switch 20. Current then flows through the first wire 116 into the diode bridge 114, through diode D5 and to the first laser diode 106. Diodes D3 and D4 prevent the current from passing therethrough, since they only allow one-way current flow. The first laser diode 106 is then energized and emits a laser line beam therefrom. The circuit from the first laser diode 106 is completed from the first laser diode 106 to the diode bridge 114, through the diode D2, through the second wire 118 and to the mode selection switch 20, through the power switch 18, and finally to the power source 22.

Figure 2B:
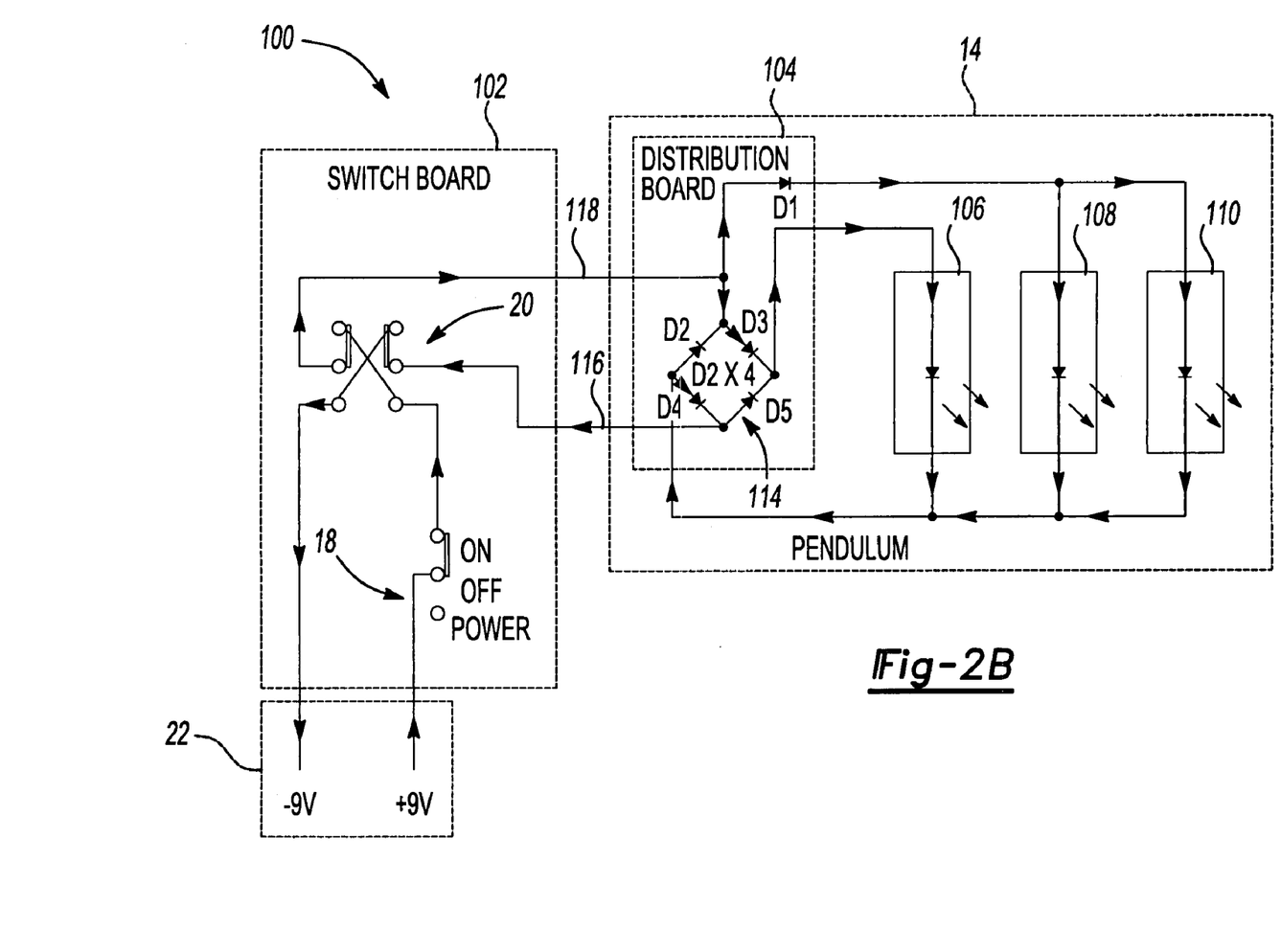
FIG. 2B is a schematic diagram of the two wire laser control circuit of the present invention in a 360° mode.

With reference to FIG. 2B, when the mode selection switch is in the "360 degree" position and the power switch is in the "power on" position, all three laser diodes 106, 108, and 110 are energized. The current path is indicated by the arrows in FIG. 2B. Specifically, current flows from the power source 22 through the power switch 18 and then on through the mode selection switch 20. Current then flows through the second wire 118 and to diode D1 and the diode bridge 114. Current through diode D1 goes on to energize the second and third laser diodes 108, 110. Current through the diode bridge 114 flows through diode D3 and on to energize the first laser diode 106. Diodes D2 and D5 prevent current from flowing therethrough. The circuit is completed from the laser diodes 106, 108, 110 to the diode bridge 114, through diode D4, through the first wire 116, through the mode selection switch 20, and through the power switch 18 onto the power source 22.

Using the above described configuration, only two wires (116 and 118) are required to selectively energize the laser diodes 106, 108, 110. This reduces the interference between the housing 12 (FIG. 1) and the pendulum 14 (FIG. 1), thereby allowing the pendulum 14 to swing freely under the force of gravity for providing accurate leveling.

Figure 3:
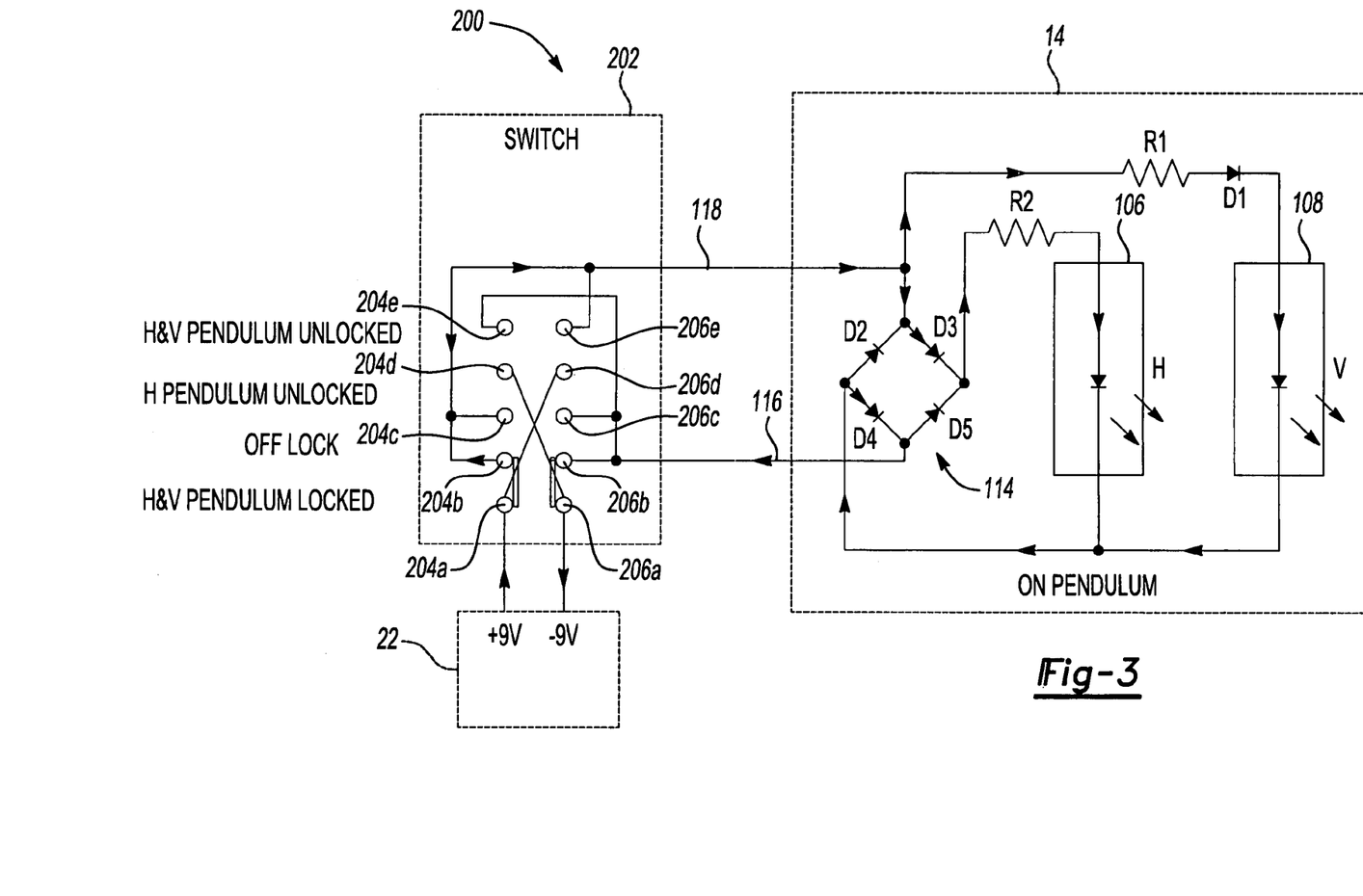
FIG. 3 is a schematic diagram of a second two wire control circuit constructed according to the principles of the present invention.

With reference to FIG. 3, a second embodiment of the two wire laser control circuit is generally indicated by reference numeral 200. The two wire laser control circuit 200 is substantially similar to the control circuit 100 illustrated in FIGS. 2A and 2B. However, control circuit 200 combines the power switch 18 (FIGS. 2A, 2B) and the mode selection switch (FIGS. 2A, 2B) with a switch 202. Moreover, only two laser diodes 106, 108 are provided corresponding to a vertical laser and a horizontal laser. Finally, the control circuit 200 includes a first resistor R1 and a second resistor R2.

The switch 202 is a two pole four position switch that includes power on and off positions, as well as positions for activating the lasers 106, 108 singley or together. The resistor R2 is located between the diode bridge 114 and the laser diode 106, while the resistor R1 is located between the diode bridge 114 and the laser diode 108. Operation and current flow of the two wire laser control circuit 200 is substantially similar to the operation of the two wire laser control circuit 100 shown and described in FIGS. 2A and 2B. In particular, as illustrated in FIG. 3, when the switch 202 is in the horizontal and vertical laser, pendulum locked position, the switch 202 engages between connectors 204A and 204B, as well as connectors 206A and 206B. Thus, the current flows from the power source 22 through connectors 204A, 204B through wire 118 to the diode bridge 114 and to diode D1. The current then flows through diode D3, resistor R2, and laser diode 106. The current that passes through diode D1 also passes through vertical laser diode 108 and returns to the diode D4 of diode bridge 114 and then back through wire 116 to the switch 202 and back to the power source 22.

When the switch is moved to the "OFF lock" position, the poles are positioned between connectors 204B, 204C and pole connectors 206B and 206C. Thus, no current is supplied to wires 116, 118. When the switch 202 is moved to the horizontal laser pendulum unlocked position, the poles are disposed between connectors 204C and 204D as well as poles 206C and 206D. Thus, current flows from the power source 22 through the switch 202 through wire 116 to the diode bridge 114 where the current flows through diode D5 and through the resistor R2 and through the horizontal laser diode 106. The current then flows back to the diode bridge 114 through diode D2, through wire 118 and back through switch 202 to the power source 22. When the switch is moved to the horizontal and vertical pendulum unlocked position, the poles are positioned between connectors 204D, 204E and connectors 206D and 206E. Thus, current travels from power source 22 through switch 202 through wire 118 where the current splits between the resistor R1 and diode bridge 114. The current passing through the resistor R1 passes through the diode D1 and through the vertical laser diode 108 while the current passing through the diode bridge 114 passes through diode D3 through resistor R2 through horizontal laser diode 106 and returns to the diode bridge 114 where it passes through diode D4 to wire 116 and back through switch 202 to the power source 22.

Figure 4A:
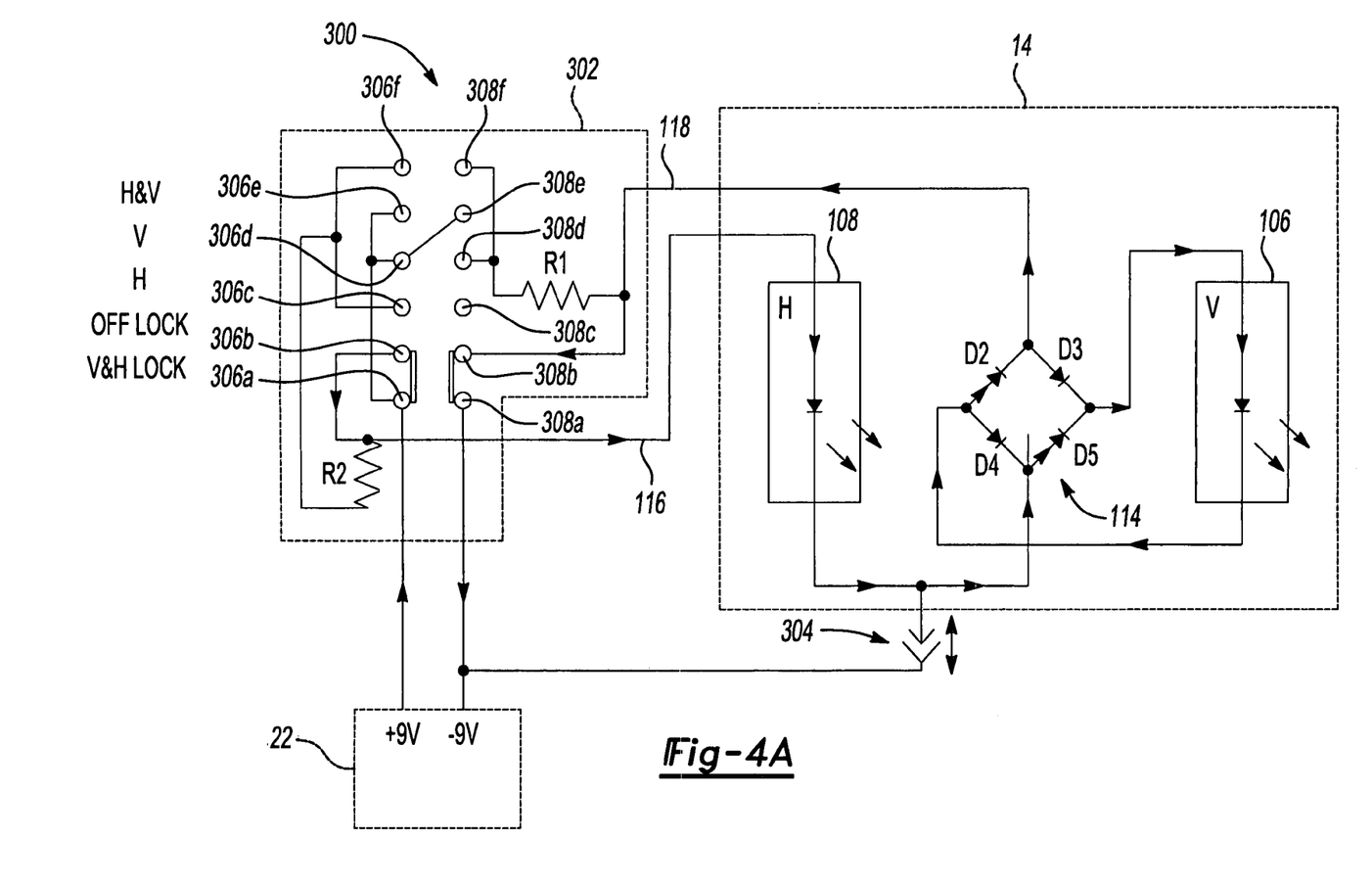
FIG. 4A is a schematic diagram of a third two wire control circuit constructed according to the principles of the present invention in a locked state.
Figure 4B:
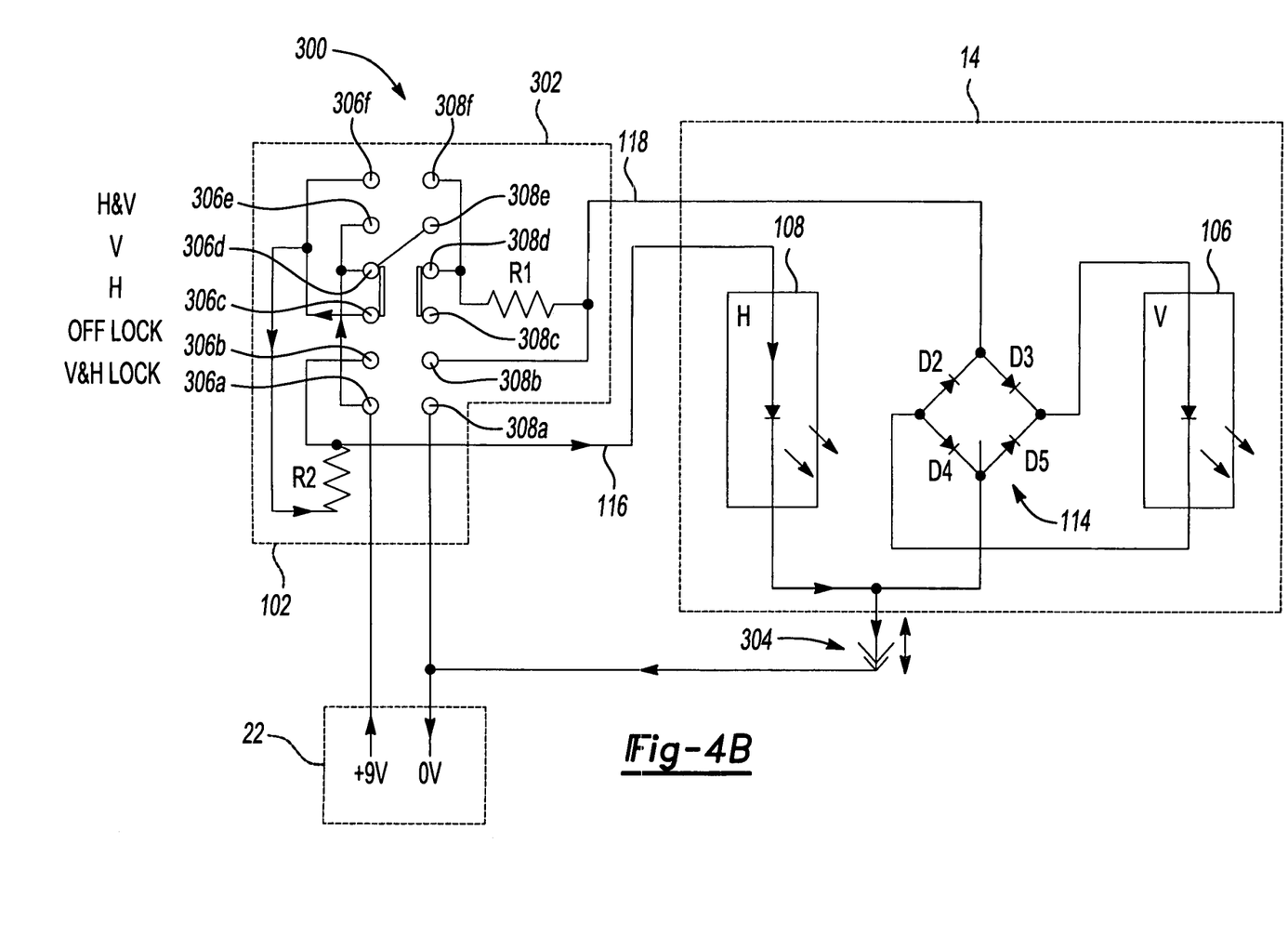
FIG. 4B is a schematic diagram of the third two wire laser control circuit of the present invention in an unlocked state.

With reference to FIG. 4A, a third embodiment of the two wire laser control circuit is generally indicated by reference numeral 300. Arrows within the diagram indicate current flow with the direction of the current flow changing based upon the switch position. The two wire laser control circuit 300 is substantially similar to the two wire laser control circuit 200 illustrated in FIG. 3. However, the second laser diode 108 is not electrically coupled directly to the switch 302 and electrically coupled to a position between diode D4 and D5 on the diode bridge 114. Additionally, return current from the second laser diode 108 is routed through a connection 304 between the pendulum 14 and the housing 12 (FIG. 1). Specifically, by locking the pendulum 14 such that the pendulum 14 cannot swing freely within the housing 12, a mechanical gap is created at the connection 304 such that return current cannot pass through the connector 304. As illustrated in FIG. 4B by the arrows representing current flow, moving the pendulum 14 to an unlocked position closes the mechanical connection 304 such that return current through the second laser diode 108 may pass therethrough so that only the horizontal laser diode 108 is energized.

With returning reference to FIG. 4A, the switch 302 includes connectors 306A–306F and connectors 308A–308F. When the switch 302 is positioned in the vertical and horizontal laser, lock position, as illustrated in FIG. 4A, the switch poles are connected between connectors 306A and 306B as well as connectors 308A, 308B. Thus, current from the power source 22 travels through the connectors 306A, 306B through wire 116 which is connected to horizontal laser diode 108. With the connection 304 being disengaged due to the pendulum being in the locked position, the current continues to travel to diode bridge 114 with current passing through diode D5 and through vertical laser diode 106 and returning to diode bridge 114. The current then passes through diode D2 and returns through wire 118 to switch 302 and to power source 22. When the switch 302 is in the "OFF lock" position, the poles connect between connectors 306B and 306C as well as connectors 308B and 308C so that no current is provided from the power source to either of the laser diodes. When the switch 302 is moved to the horizontal ("H") laser position such that the poles are connected between connectors 306C and 306D as well as connectors 308C and 308D, as illustrated in FIG. 4B. The current then travels in the direction of the arrows so that the current passes through resistor R2 and through wire 116 through the horizontal laser diode 108 and with the pendulum in the unlocked position the connection 304 is complete so that current returns to the power source 22 through the connector 304. With the switch 302 moved to the vertical ("V") position, the poles of the switch are connected between connectors 306D and 306E as well as connectors 308D and 308E. The current then flows from the power source 22 through the switch 302 with current traveling from connectors 306D to connector 308E so that current then flows through resistor R1 and through wire 118 to diode bridge 114. The current then flows through diode D3 to the laser diode 106 and returns to the diode bridge 114 and passes through the diode D4 and returns to the power source 22 through the closed connector 304.

With the switch 302 positioned in the horizontal and vertical laser diode ("H & V") positions, the poles are connected between connectors 306E and 306F as well as connectors 308E and 308F so that current from the power source 22 travels from connector 306E to connector 306F and therefore through resistor R2 which delivers current to the horizontal laser diode 108 via wire 116. The current is also traveling simultaneously through diagonal switch connection 310 from connector 306D to connector 308E and then to connector 308F. Thus, current also flows through resistor R1 through wire 118 to diode bridge 114. The current then flows through diode D3 to the vertical laser diode 106 and returns to the diode bridge 114 and passes through diode D4 and returns to the power source 22 through connector 304 which is closed. Thus, the horizontal and vertical lasers are both energized with current flowing therethrough in parallel.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A laser control circuit for a laser leveler comprising:
a switch mounted on a housing in connection with a power source, the switch having a first position and a second position;
a diode bridge mounted on a pendulum;
a plurality of lasers mounted on the pendulum and electrically coupled to the diode bridge;
a first wire extending from the switch to the diode bridge; and
a second wire extending from the switch to the diode bridge;
wherein current from the switch passes through the first wire to the diode bridge and to one of the plurality of lasers when the switch is in the first position, and wherein current from the switch passes through the second wire through the diode bridge and to all of the plurality of lasers when the switch is in the second position.

2. The laser control circuit of claim 1, wherein said switch provides current through said first wire to said diode bridge when said switch is in said first position and said switch provides current through said second wire to said bridge when said switch is in said second position.

3. The laser control circuit of claim 2, wherein said diode bridge includes a first diode that is connected to said first wire and allows current flow to said one of said plurality of lasers when the switch is in the first position and a second diode that is connected to said one of said plurality of lasers to allow current to flow from said one of said plurality of lasers through said second diode, said second wire, and said switch and back to said power source.

4. The laser control circuit of claim 3, wherein said diode bridge includes a third diode that is connected to said second wire and allows current flow to said one of said plurality of lasers when the switch is in said second position and a fourth diode that is connected to said one of said plurality of lasers to allow current to flow from said one of said plurality of lasers through said fourth diode, said first wire, and said switch and back to said power source.

5. The laser control circuit of claim 4, wherein said second wire is connected to a fifth diode that allows current to flow from said second wire to remaining ones of said plurality of lasers when the switch is in said second position.

6. The laser control circuit of claim 5, further comprising a resistor disposed between said second wire and said fifth diode.

7. The laser control circuit of claim 4, further comprising a resistor disposed between said third diode and said one of said plurality of lasers.

8. The laser control circuit of claim 1, wherein said switch includes a third position in which said power source is disconnected from said first and second wires.

9. A laser control circuit for a laser leveler comprising:
a switch mounted on a housing in connection with a power source, the switch having a first position and a second position;
a diode bridge mounted on a pendulum;
a plurality of lasers mounted on the pendulum and electrically coupled to the diode bridge;
a first wire extending from the switch to one of said plurality of lasers, said one of said plurality of lasers being electrically connected to the diode bridge; and
a second wire extending from the switch to the diode bridge;
wherein current from the switch passes through the first wire to said one of said plurality of lasers and back to said power source when the switch is in the first position, and wherein current from the switch passes through the first wire to said one of said plurality of lasers and back to said power source and current simultaneously flows from the switch through the second wire through the diode bridge and to a remaining one of the plurality of lasers and back to said diode bridge and to said power source when the switch is in the second position.

10. The laser control circuit according to claim 9, wherein said switch includes a third position wherein when said switch is in said third position, said switch provides current flow to said second wire that passes through said diode bridge to said remaining one of said plurality of lasers and back to said diode bridge and the power source.

11. The laser control circuit according to claim 9, further comprising an electrical connection disposed between said one of said plurality of said lasers and said diode bridge and connected to said power source.

12. The laser control circuit according to claim 11, wherein said electrical connection is closed when said pendulum is in an unlocked condition for free movement relative to said housing and said electrical connection is open when said pendulum is in a locked condition wherein said pendulum is restrained from moving relative to said housing.

* * * * *